UNITED STATES PATENT OFFICE.

JOSEPH KOETSCHET AND MAURICE BEUDET, OF LYON, FRANCE, ASSIGNORS TO SOCIETE CHIMIQUE DES USINES DU RHONE, ANCIENNEMENT GILLIARD, P. MONNET ET CARTIER, OF PARIS, FRANCE.

MANUFACTURE OF ETHYLIDENE DIACETATE.

1,304,989.   Specification of Letters Patent.   Patented May 27, 1919.

No Drawing.   Application filed December 7, 1917.   Serial No. 206,125.

*To all whom it may concern:*

Be it known that we, JOSEPH KOETSCHET, a citizen of the Swiss Republic, of 67 Boulevard des Belges, Lyon, France, and MAURICE BEUDET, a citizen of the Republic of France, of 25 Rue Begeaud, Lyon, France, have invented certain new and useful Improvements in the Manufacture of Ethylidene Diacetate, of which the following is a specification.

It is known from German Patent No. 271,381 that ethylidene diacetate can be prepared by causing acetylene to react with glacial acetic acid in presence of sulfate or phosphate of mercury.

It has been found that this reaction takes place in a very efficient manner with sulfate of mercury; in order to accelerate the fixation of the acetylene however, working at about 90° C. is necessary. At this high temperature there is a pretty intense formation of tar, and moreover the ethylidene diacetate undergoes appreciable splitting up owing to the sulfuric acid liberated by decomposition of the catalyzer.

All the other mineral acid salts of mercury act incomparably less well than the sulfate. In particular the phosphate (the only salt besides sulfate cited in the patent) has absolutely no action. It is the same with the chlorid of mercury.

The specification of the patent states further that the reaction can be facilitated by adding mineral acids or acid salts to the catalyzer. Experiments made in this sense, however, have shown that only sulfuric acid produced an appreciable effect, on lowering the temperature of reaction, but that this addition had the serious disadvantage of considerably reducing the yield.

All this shows that the reaction is far from having the general character attributed to it by the German patent.

Now we have found that all the above drawbacks can be avoided by replacing sulfate of mercury by the esters (ethereal salts) of sulfuric acid in presence of acetate of mercury. In the first rank of these must be placed methylene sulfate.

Example.

Into a solution of oxid of mercury 40 parts in glacial acetic acid 1100 parts are added while stirring, methylene sulfate 20 parts. Heat to about 50°–70° C. and pass in the acetylene (the absorption of which is integral) until 200 parts have been fixed.

What we claim and desire to secure by Letters Patent is:

1. A process of producing ethylidene diacetate by the action of acetylene on acetic acid, in the presence of esters (ethereal salts) of sulfuric acid and acetate of mercury.

2. A process of producing ethylidene diacetate by the action of acetylene on acetic acid, in the presence of methylene sulfate and acetate of mercury.

In testimony whereof we have signed our names to this specification.

JOSEPH KOETSCHET,
MAURICE BEUDET.

Witnesses:
L. ERCHE,
MARIN VIACHON.